Patented June 15, 1937

2,083,961

UNITED STATES PATENT OFFICE 2,083,961

INSULATING PLASTER

Gustave Adolph New, New York, N. Y., assignor to Thurlow G. Gregory

No Drawing. Application June 10, 1936, Serial No. 84,521

6 Claims. (Cl. 106—18)

This invention relates to an insulating wall plaster of high insulating coefficient and of sufficient structural strength to be used as a base coat and of such characteristics that it may be applied to side walls and ceilings with regular troweling tools. It has low water carrying consistency or low water retaining properties, and other advantages as are hereinafter shown.

Due to the relative thinness with which all base coat wall plasters are usually applied, it is desirable that a somewhat large ratio of insulating matter be included in such insulating masses. Heretofore this has been difficult to achieve. Larger ratios of insulating matter may be used as a result of this invention and plaster rot avoided.

In the preferred embodiment of this invention exfoliated vermiculite and granular cork, or like substance, are used in combination and mixed with a recrystallizing binder such as partially calcined gypsum, gypsum stucco, Keene's cement, lime, natural cement, or the like, and when the ratio of insulating matter is in relatively high range there is preferably included with the mixture colloidal matter that becomes slippery and adhesive when wet. Such colloidal matter may, however, when desired, be advantageously omitted entirely when the insulating matter is in lower ratio. When desired, therefore, the colloidal matter may be used with granular cork or exfoliated vermiculite and a recrystallizing binder and not necessarily with a mixture of exfoliated vermiculite and granular cork although the mixture of vermiculite and cork is usually preferred.

Cork is one of the best insulating substances yet discovered. It is thoroughly non-absorptive of water and being water repellant, is highly desirable for use in mixtures that are to be plasticized with water. It is of strong, tenacious character though light in weight. It is of such character that recrystallizing binders readily bond thereto.

When granular cork is used in plasters of the kind herein shown and in sufficient amount to impart high insulating coefficient it, however, has the disadvantage of imparting short working characteristics to the mass which is a most objectionable feature as short working plasters fall off the plaster's trowel or pull apart when being applied and are, therefore, impractical for use by trowel. Other light weight granular matter such as granular wood or granulated hulls possess the same undesirable characteristics when so used.

Exfoliated vermiculite also has very high insulating properties but when used in sufficient amount to impart high insulating coefficient to such plasters, it has the undesirable properties of absorbing a large amount of water and of forming plaster masses of low structural strength.

Exfoliated vermiculite, however, possesses the desirable properties of being of a silky, slippery nature imparting both plasticity and trowel slip to a plaster mass within which it is contained.

I have discovered that when exfoliated vermiculite is supported in a plaster mass by the presence of light weight, granular insulating matter such as granulated cork or the like and to which a recrystallizing binder will readily bond, the structural or compressive strength of the mass is considerably increased by the presence of the cork and the exfoliated vermiculite imparts trowel slip as well as insulating value to the plaster.

Therefore, when exfoliated vermiculite is used in combination with granular cork, or the like, the resulting plaster mix when properly proportioned has trowel slip and low water carrying consistency when wet and structural or compressive strength and high insulating coefficient when it has dried out and hardened.

As colloidal substance that becomes slippery and adhesive when wet, I employ dextrine or bentonite or a mixture of bentonite and a substance to react with the bentonite, of which lime, raw gypsum or Portland cement are examples. Dextrine is the preferred colloid as it further reduces the water carrying consistency of such plaster masses, sometimes causing an additional reduction of as much as 10% to 20% and thereby hastens the drying. However, bentonite when properly proportioned also hastens the drying.

Due to the silky, slippery nature of exfoliated vermiculite, larger proportions of dextrine or bentonite may be used therewith in plasters without making a sticky mass.

By the use of the herein described substances, plaster masses of high insulating coefficient and of structural strength and which may be readily applied by trowel and which have sufficiently low water carrying consistency to prevent plaster rot may be prepared, and the use of such non-adhesive substances as talc or asbestos may, if desired, be omitted.

In order to produce such a plaster of structural strength, and which may be applied by trowel to side walls and ceilings the recrystallizing binder in the herein described plaster should be 50% or more of the dry weight of the plaster.

The plaster ingredients may be mixed dry and be transported dry to the place of use and there plasticized with water.

It is believed to be clear from the description wide variety of formulae may be used within the workable ranges of proportions of the ingredients shown in the herein described invention, and for brevity the following ranges by weight are given of the proportions effective for all of the ingredients in some combination within the ranges and from which those skilled in the art may readily compound this plaster, using the ingredients in the ratio best suited to his needs:

| | Pounds to the ton |
|---|---|
| Insulating matter from the group consisting of granular cork, waterproofed granular wood, waterproofed granulated hulls, waterproofed corn cobs and mixtures thereof | 75 to 600 |
| Exfoliated vermiculite | 30 to 500 |
| A recrystallizing binder from the group consisting of partially calcined gypsum or other gypsum stucco, Keene's cement, natural cement and lime | 1150 to 1700 |
| Colloidal matter from the group consisting of dextrine, bentonite, and bentonite with reacting substance from the group consisting of lime, raw gypsum and Portland cement | 10 to 100 |
| Commercial retarder | 0 to 6 |
| Hair fibre | 0 to 3 |

As a further assistance to those desiring to make this herein described plaster, the following detailed formulae are given:

| Type of binder | Amt. of binder | Granular cork | Exfol. vermiculite | Bentonite | Reactant | Dextrine | Retarder | Hair fibre |
|---|---|---|---|---|---|---|---|---|
| Gypsum stucco | 1374 | 500 | 100 | | | 12 | 2 | 2 |
| Keene cement | 1523 | 125 | 350 | | | | | 2 |
| Gypsum stucco | 1500 | 100 | 350 | 39 | Lime 5 | | 4 | 2 |
| Gypsum stucco | 1477 | 500 | | 12 | Lime 7 | | 2 | 2 |
| Keene cement | 1480 | 450 | 50 | | | | | 2 |

The exfoliated vermiculite is effective when in expanded granular state, said expansion resulting from heat treatment, and will usually be so used, but it may, when desired, be reduced to finely divided state by friction or other means after its expansion and included in the mix in this finely divided state, as it also imparts trowel slip when in this finely divided state. Expanded vermiculite in granular form and expanded vermiculite that has been subsequently reduced to finely divided condition are, therefore, contemplated in the term exfoliated vermiculite when used herein and in the appended claims.

Granular wood, or granulated hulls, or granulated corn cobs, may be used with or in the place of the cork herein described but the granular wood, granulated hulls or granulated corn cobs, when used in the larger ratios, should preferably be pre-treated with a water resisting compound such as paraffine, casein, creosote, tar, zinc stearate, aluminum stearate, calcium stearate, or the like, all of which is referred to herein as waterproofing. This pre-treatment imparts water-repelling properties to such media much like that natural characteristic present in granular cork. This prevention of water absorption assists in eliminating plaster rot.

The dextrine or bentonite, being substances of quick water absorptive properties, appear to quickly absorb a portion of the water and hold it within itself for subsequent release to the binder, which tends to prevent it going as free water into the openings in the light weight matter. The water so held by the colloidal adhesive matter and also that water inhibited by the water-resisting properties of the cork, or the water proofing when used on water absorptive matter, dries out of the mass much more quickly than will free water entrapped within light weight porous insulating media.

When relatively large amounts of exfoliated vermiculite are used it is desirable to mix the dry adhesive colloidal matter with the dry vermiculite and thoroughly agitate the mixture before mingling these ingredients with the binder. By this means the colloidal matter becomes present in the mixture at the places where its properties become most effective.

The granulated cork as large as 8-20 and as small as almost pulverized state has been effective but 20-40 size is preferred. All of these sizes of cork or like matter, as well as exfoliated vermiculite are contemplated in the term finely divided.

When the binder used is a substance that will react with bentonite no separately inserted reactant is required when bentonite is used. This is believed to be obvious to those skilled in the art and is contemplated in the spirit of the appended claims as is the use of moderate amounts of sand.

This application is continuation in part of my application Serial No. 734,430 filed July 9, 1934.

Other modes of applying the principle of my invention may be employed, change being made as regards the materials employed, provided the ingredients stated by any of the following claims or the equivalent of such stated ingredients be employed and I do not wish my invention to be limited to the particular materials or proportions given in the exemplary compositions except in accordance with the spirit and scope of the appended claims.

Having described my invention, I claim

1. A dry plaster mixture capable of being plasticized with water and comprising a mixture of exfoliated vermiculite approximately 30 to 500 parts by weight; light weight insulating substance from the group consisting of granular cork, water proofed granular wood, water proofed granulated hulls, water proofed granulated corn cobs and mixtures thereof, approximately 75 to 600 parts by weight; colloidal matter from the group consisting of dextrine, bentonite, and bentonite with reacting substance from the group consisting of lime, raw gypsum and Portland cement approximately 10 to approximately 100 parts by weight; a recrystallizing binder from the group consisting of gypsum stucco, Keene's cement, natural cement and lime approximately 1150 to approximately 1700 parts by weight.

2. A plaster mixture ready to be plasticized with water and comprising substantially:

| | Pounds |
|---|---|
| Gypsum stucco | 1374 |
| Granular cork | 500 |
| Exfoliated vermiculite | 100 |
| Dextrine | 12 |
| Retarder | 2 |
| Hair fibre | 2 |

3. A dry plaster mix adapted to be admixed with water and applied by ordinary trowelling tools and comprising a mixture of exfoliated vermiculite; light weight insulating matter from the group consisting of granular cork, waterproofed granular wood, waterproofed granulated hulls, waterproofed granulated corn cobs, and mixtures thereof; a suitably retarded recrystallizing binder of the group consisting of gypsum stucco, Keene's cement, natural cement and lime, said recrystallizing binder constituting more than half of the dry weight of the mix, said granular insulating material being present in quantity to impart substantially its own inherent compressive strength to the mass and the vermiculite being present in quantity to overcome the short working characteristic resulting from the presence of such quantity of granular insulating material.

4. A dry plaster mixture capable of being plasticized with water and comprising a mixture of exfoliated vermiculite approximately 30 to 500 parts by weight; light weight insulating substance from the group consisting of granular cork, water proofed granular wood, water proofed granulated hulls, water proofed granulated corn cobs and mixtures thereof, approximately 75 to 600 parts by weight; and a suitably retarded recrystallizing binder from the group consisting of gypsum stucco, Keene's cement, natural cement and lime approximately 1150 to approximately 1700 parts by weight.

5. A plaster composition comprising a set mass including, in intimate admixture, exfoliated vermiculite 30 to 500 parts by weight; light weight insulating substance from the group consisting of granular cork, water proofed granular wood, water proofed granulated hulls, water proofed granulated corn cobs and mixtures thereof, approximately 75 to 600 parts by weight; and a suitably retarded recrystallizing binder from the group consisting of gypsum stucco, Keene's cement, natural cement and lime, said binder being present in excess of the weight of the above named ingredients.

6. A plaster composition comprising a set mass including, in intimate admixture, exfoliated vermiculite 30 to 500 parts by weight; colloidal matter from the group consisting of dextrine, bentonite, and bentonite with a reacting substance from the group consisting of lime, raw gypsum and Portland cement approximately 10 to approximately 100 parts by weight; light weight insulating substance from the group consisting of granular cork, water proofed granular wood, water proofed granulated hulls, water proofed granulated corn cobs and mixtures thereof, approximately 75 to 600 parts by weight; and a suitably retarded recrystallizing binder from the group consisting of gypsum stucco, Keene's cement, natural cement and lime, said binder being present in excess of the weight of the above named ingredients.

GUSTAVE ADOLPH NEW.